Sept. 10, 1929.  E. A. JOHNSTON ET AL  1,727,708
COTTON PICKER
Filed Dec. 2, 1926   5 Sheets-Sheet 1
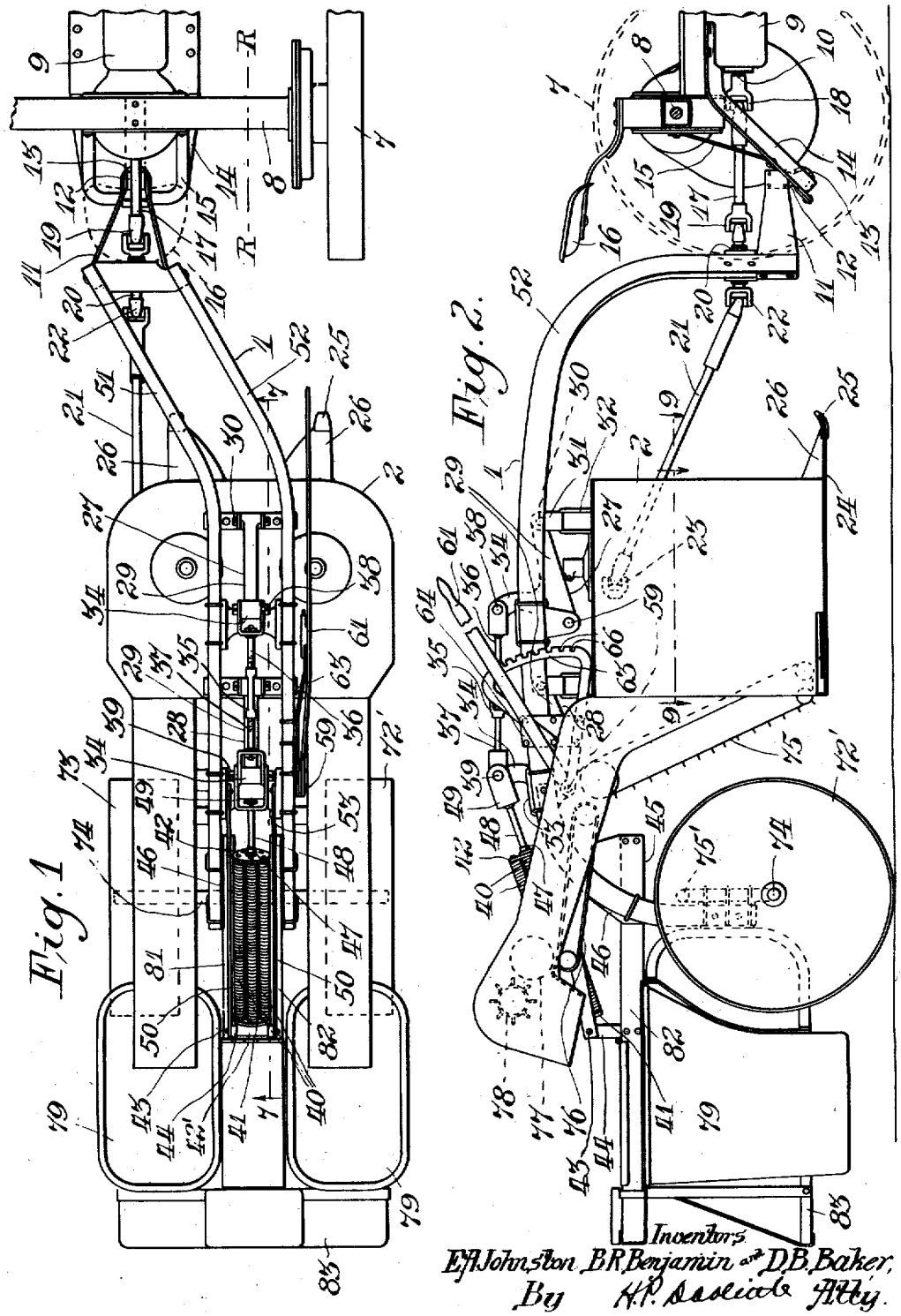
Inventors
E.A.Johnston, B.R.Benjamin and D.B.Baker,
By H.P.Deeinds Atty.

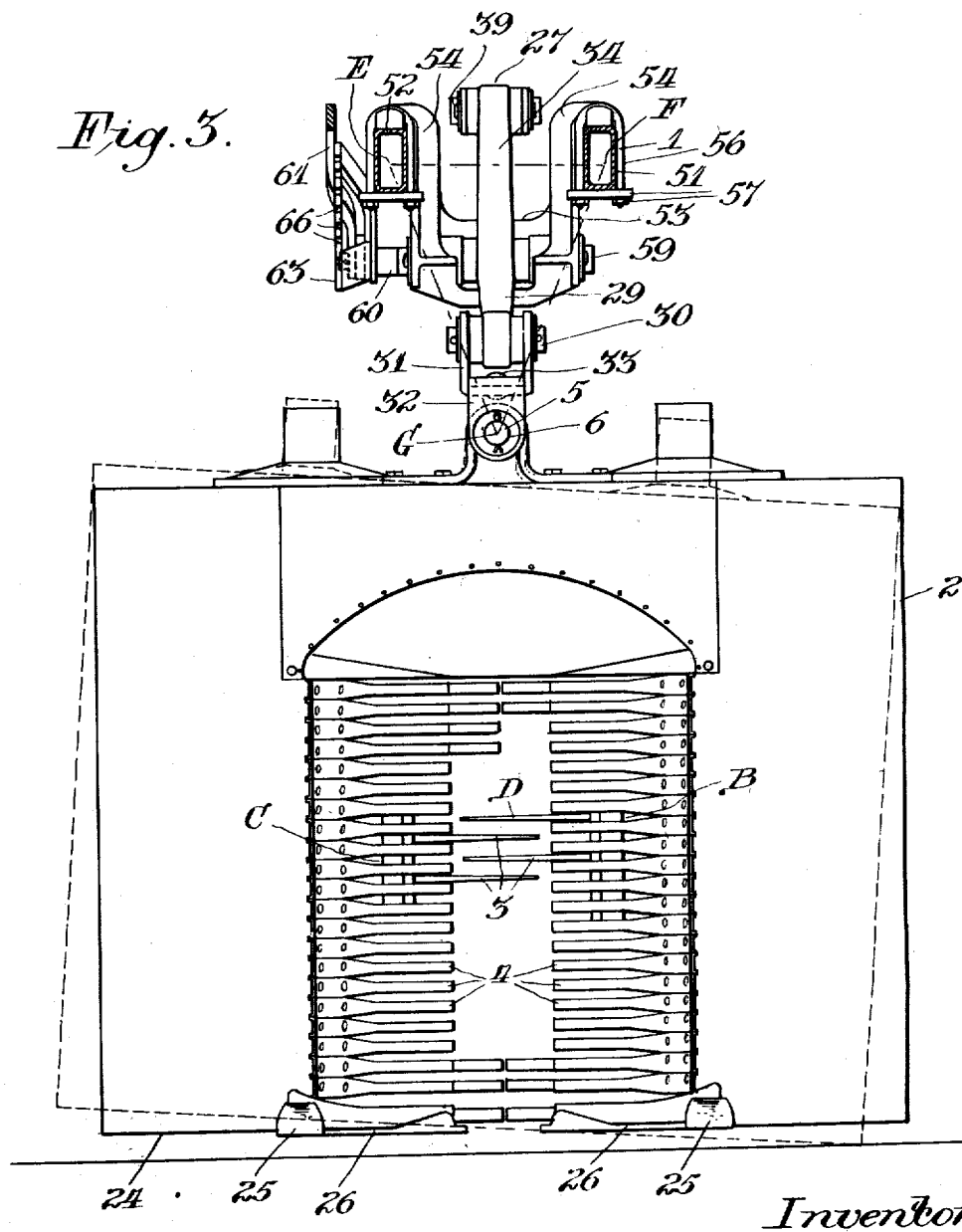

Sept. 10, 1929.  E. A. JOHNSTON ET AL  1,727,708
COTTON PICKER
Filed Dec. 2, 1926  5 Sheets-Sheet 3
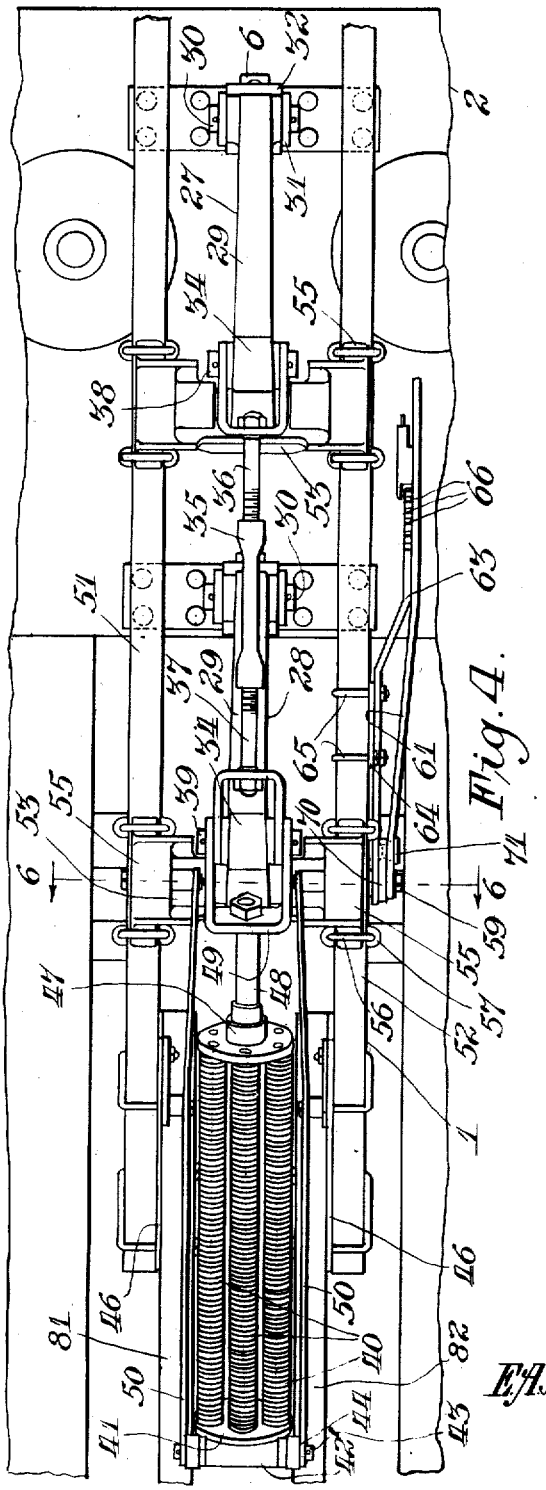
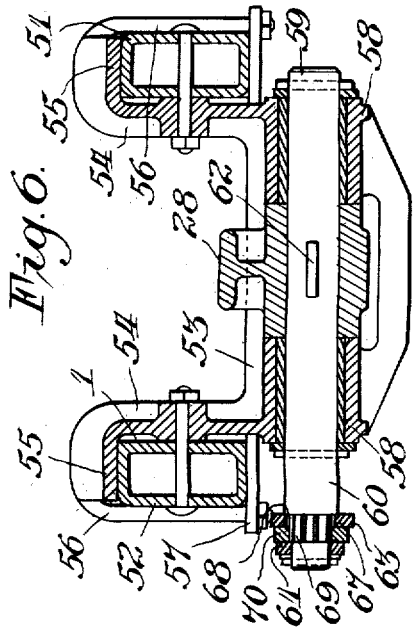
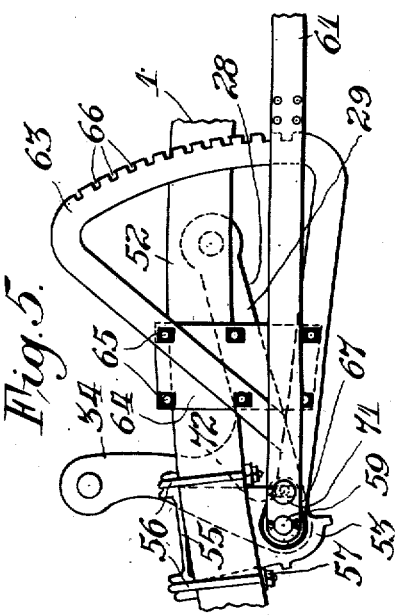
Inventors.
E.A.Johnston, B.R.Benjamin and D.R.Baker,
By W.P. Daniels
Atty.

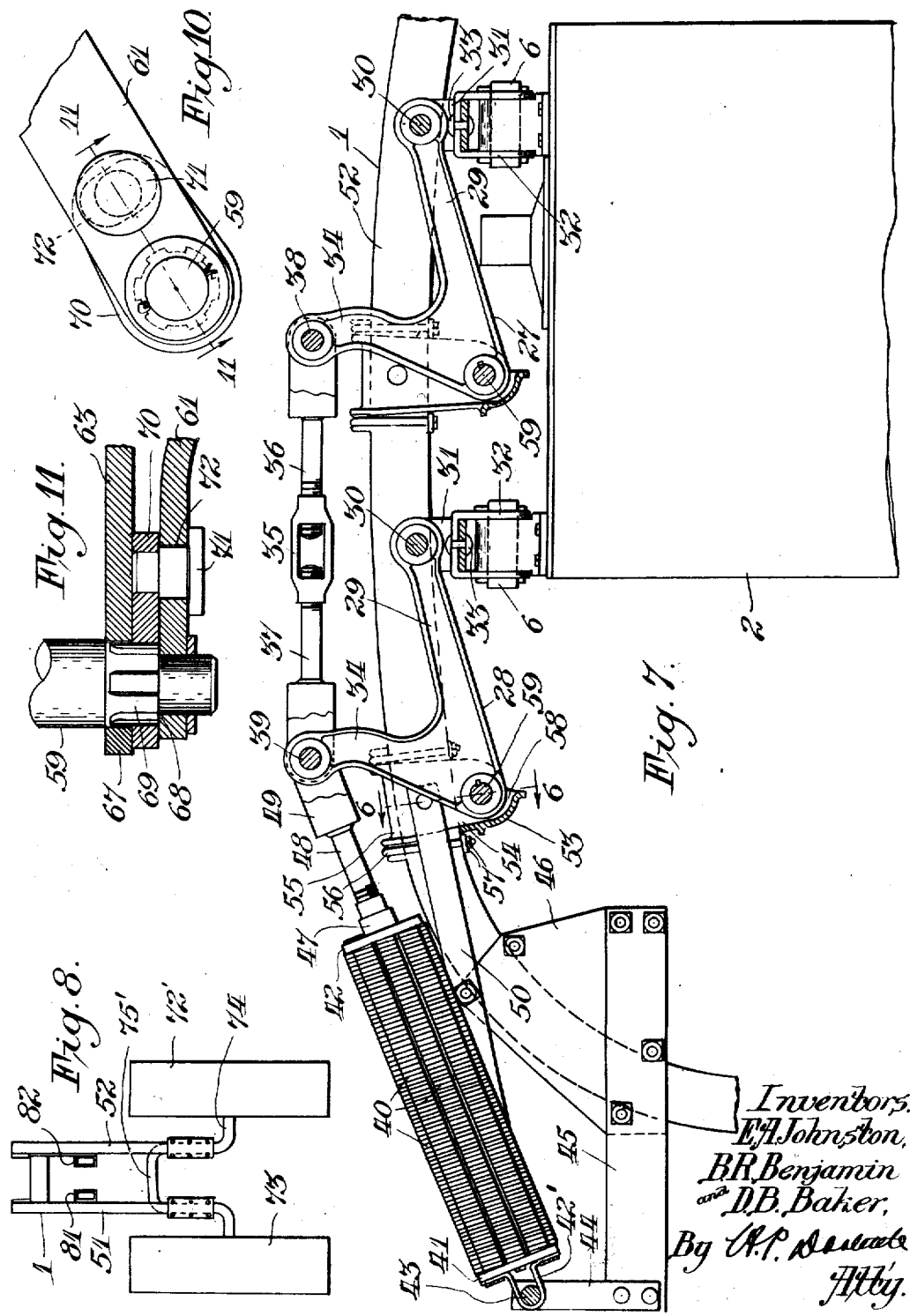

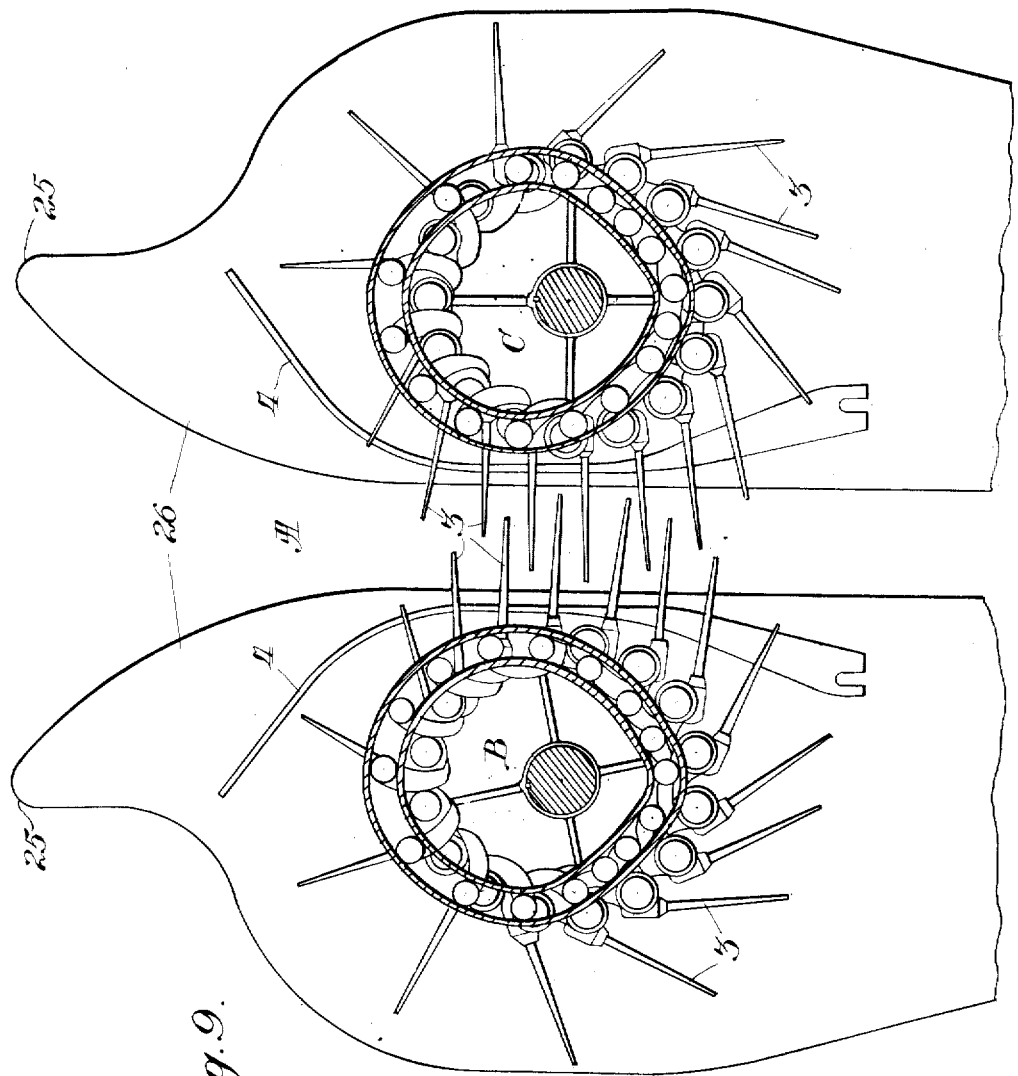

Patented Sept. 10, 1929.

1,727,708

UNITED STATES PATENT OFFICE.

EDWARD A. JOHNSTON, OF CHICAGO, BERT R. BENJAMIN, OF OAK PARK, AND DAVID B. BAKER, OF CHICAGO, ILLINOIS, ASSIGNORS TO INTERNATIONAL HARVESTER COMPANY, OF CHICAGO, ILLINOIS, A CORPORATION OF NEW JERSEY.

COTTON PICKER.

Application filed December 2, 1926. Serial No. 152,093.

This invention relates to cotton pickers and more particularly to a cotton picker employing a large number of spindles which are projected into cotton plants, then rapidly rotated to wind the mature cotton thereon, and thereafter withdrawn from the plants in order that the cotton may be removed from the spindles.

A cotton picker of the above mentioned type must be equipped with a large number of spindles. These spindles or picker stems are arranged in a plurality of gangs or batteries, the batteries being spaced apart so as to provide a passage-way for a row of cotton plants. The batteries are supported upon a traveling frame so that the picker stems of the batteries may be projected into a row of plants from opposite sides of the row. With an arrangement of this kind the picker stems often encounter abnormal resistance as they are projected into the plants. They may engage the plant stems or stalks, or they may become entangled in a mass of plants compressed to an unusal degree. Such occurrences would cause a failure of the machine to successfully perform its functions by reason of the breakage or twisting of the picker stems.

It is an object of the present invention to provide a machine in which such breakage will be reduced to a minimum.

It is another object of the invention to provide a cotton picker which will successfully operate in spite of unskillful handling, as for instance, when the machine is steered along an irregular path not parallel or coincident with the row of plants operated upon.

A further object of the invention is to present a cotton picker which will not be hindered in its successful operation by extreme variation in the size of the cotton plants or by unusual crookedness of the rows of plants.

The invention also provides a practical and successful cotton picker having a novel frame construction for pendently supporting batteries of picker stems.

A further object of the invention is to provide a cotton picker with effective gathering platforms which will insure that all cotton plants pass through the picker mechanism of the machine. In the disclosed machine, the gathering platforms also prevent retardation of the progress of the machine due to the piling up of earth in front of the picker mechanism.

It is also an object of the invention to so mount the picker mechanism upon a main frame that the unsprung weight of the picker mechanism is negligible as compared with its total weight.

The invention may be readily understood by reference to the accompanying drawings in which a preferred embodiment is shown.

In the drawings,—

Figure 1 is a plan of the illustrative cotton picker;

Figure 2 is a side elevation of the preferred embodiment shown in Figure 1;

Figure 3 is a front elevation as regards the picker mechanism of the illustrative machine and a vertical sectional view as regards a part of the frame for supporting the picker mechanism;

Figure 4 is an enlarged top plan view of a part of the machine showing in detail the illustrative devices for supporting the picker mechanism;

Figure 5 is a detail view showing the construction of a part of the adjusting and supporting mechanism for the picker mechanism;

Figure 6 is a detail view of a part of the connections between the picker mechanism and the main frame, showing those connections in vertical section and taken on the section line 6—6 of Figure 4;

Figure 7 is a view taken in a vertical plane substantially in the plane indicated by the section line 7—7 in Figure 1, showing in detail the preferred embodiment of the devices for supporting the picker mechanism;

Figure 8 is a somewhat diagrammatic rear elevation of the cotton picker showing the arrangement of the frame members, the rear axle, and the rear supporting wheels;

Figure 9 is a somewhat schematic view showing the relation of the rotating picker stems to the plant receiving passage-way and indicating the operative movements of the picker stems, this view being taken on a line such as indicated by the section line 9—9 of Figure 2, with the casing and covering parts of the picker mechanism removed for the purpose of clarity;

Figure 10 is a detail view of the lever construction for allowing the picker mechanism to have a limited floating movement; and Figure 11 is a detailed sectional view of the structure shown in Figure 10, taken on the line 11—11.

As shown clearly in Figure 2 of the drawings, the illustrative cotton picker comprises a main frame 1 preferably considerably arched in a fore and aft direction. Depending from the main frame is a picker mechanism of the type which will be readily understood by reference to Figure 9 of the drawings. In this type of picker mechanism a plant passage-way A is provided between two batteries, such as B and C, each composed of a large number of picker stems 3. In this type of machine the frame is propelled along a row of plants which are received within the passage-way A. The plants are compressed within this passage-way by reason of the rearwardly diverging walls formed by the guide bars 4. As the plants pass along the central portion of the passage-way A in their compressed condition, the picker stems 3 are projected into the plants from each side of the passage-way. The picker stems are rotated while within the plants so as to gather the mature cotton. After the cotton is wound upon the picker stems and the plants move further rearwardly along the passage-way, the picker stems are withdrawn and the cotton substantially removed, whereupon the picker stems continue their course in the endless path indicated in Figure 9. They then re-enter the passage-way A and in this way perform a continuous operation in the picking of the cotton.

As it is advantageous to construct the picker stems in the form of slim steel spindles in order to prevent the gathering of an excessive amount of plant leaves and stalks; as the plants are compressed to a substantial degree within the zone of operation of the spindles within the passage-way A; and as the picker stems may come in contact with large portions of the stalks of the plants, the picker stems are subjected to abnormal strains which would cause excessive breakage, were not some provision made for allowing the picker stems to yield when such resistance is encountered. In the illustrative machine the entire picker mechanism is supported upon a single substantially horizontal axis so that it may freely swing laterally of the path of progress of the machine as the pickers are projected into the passage-way A. In the illustrative machine, the manner in which the picker mechanism is so hinged is illustrated in Figure 3. The axis upon which the entire picker mechanism may bodily swing transversely of the path of movement of the machine is illustrated as the center line 5 of the pivot pin 6, constituting a part of the pivotal connections between the frame 1 and the picker mechanism. Thus, referring to the illustration shown in Figure 3 of the drawings, as the picker stem D is projected toward the left so as to encounter the plant stalk, the picker mechanism may bodily swing to the right to prevent breakage of the picker stem. Other advantageous results are also accomplished by the above described mounting of the picker mechanism. For instance, if the cotton picker be unskillfully guided so that the plant receiving channel A is not centrally located with respect to the frame, the plants form a sufficient guide for swinging the picker mechanism so that it may successfully continue its operation in spite of careless steering of the machine. Destructive side thrusts resulting from the side sway of the picker mechanism are advantageously counteracted by the triangular arrangement of the supporting elements, that arrangement being indicated by the triangle E, F, G in Figure 3.

Referring to Figures 1 and 2 of the drawings, the forward end of the arched main frame is shown supported by a tractor having supporting wheels 7, rear axle 8, transmission 9, and power take-off 10. The main frame 1 is preferably provided with a forward extension 11 provided with a ball and socket joint member 12 adapted to be received within a cooperating joint member 13 carried by an extension 14 of the frame of the tractor. Inasmuch as the illustrative tractor straddles two rows of plants, and as the picker mechanism acts only upon one row of plants received within the passage-way A, the frame of the picker is offset with relation to the center of the tractor, as indicated clearly in Figure 1 of the drawings, the line of the row of plants being operated upon by the picker being indicated by the section line R—R in Figure 1.

The tractor is shown as having the extension 14 supported by a brace 15 extending from the rear axle, above which is mounted the conventional form of seat 16 for the operator. Beneath the axle of the tractor a short driving shaft 17 is provided connected at its forward end by means of the universal joint 18 to the power take-off 10 and connected at its other end by another universal joint 19 with a short driving shaft 20 journaled within the forward end of the main frame of the picker. A driving shaft 21 extends upwardly from the drive shaft 20 and is connected thereto by means of a universal joint 22. At the rear end of the driving shaft 21 there is a universal joint connection 23 with undisclosed suitable driving connections for transmitting power for rotating the picker stems 3 and for causing them to move through the endless paths indicated in Figure 9 of the drawings.

It is to be understood that Figure 2 shows the picker mechanism mounted in its elevated or inoperative position. When the picker mechanism is to be placed in operation, its entire body indicated by the numeral 2 in Figure 2 is lowered so that the lower wall 24 of the picker mechanism is in contact with the ground, the upturned ends 25 of the gathering platforms 26 serving to prevent the entrance of dirt into the picker mechanism and to facilitate the progress of the machine along the ground. It is necessary that the picker mechanism operate in the manner just described in order that all of the cotton bearing branches of the plants may be picked up by the gathering platforms 26 and guided into the passageway A where the picking operation is performed by the picker stems 3.

The entire picker mechanism is preferably associated with the main frame by means of pivotal connections, parts of which are herein shown as the bell cranks 27 and 28. The arrangement and structure of these pivotal connections will be more clearly understood by reference to Figure 7 of the drawings. Each bell crank has a lower forwardly projecting arm 29 carrying a pivot pin 30 from which the picker mechanism is supported by means of upper and lower U-shaped elements designated respectively by the numerals 31 and 32 and clearly shown in Figures 3 and 7 of the drawings. These elements are preferably united by a central securing means herein shown as a rivet 33. The lower of the U-shaped elements carries the above mentioned pivot pin 6 about the horizontal axis of which the entire picking mechanism is free to swing laterally of the path of progress of the machine.

Each bell crank is also provided with an upwardly extending arm 34, the arms of the two bell cranks being connected so as to move in unison. The illustrative connection between these arms is a turnbuckle 35 composed of the oppositely screw-threaded rods 36 and 37, the remote ends of which are journaled upon the pivot pins 38 and 39 of the respective bell cranks. It will be appreciated that the picker mechanism may be moved so that its bottom wall is slightly inclined to the horizontal by appropriate adjustment of the turnbuckle 35.

It is desirable that the picker mechanism be practically freely movable vertically as it is drawn along the ground and, for accomplishing this result, the illustrative machine is designed so that the picker mechanism has a negligible proportion of unsprung weight while it is in operation. The devices for effecting this result include a plurality of tension springs 40 preferably arranged in the form of a hollow cylinder between the heads 41 and 42, the ends of the spring being securely fixed to the respective heads. As shown clearly in Figure 7 of the drawings, the head 41 is secured to the frame by means of a hasp 42', a pivot pin 43, a standard 44, a frame extension 45, and a plate 46 bolted, as shown, to the main frame 1. The head 42 is provided with a socket 47 for screw-threadedly receiving the rod 48 rigid with a yoke 49 pivoted upon the pivot pin 39.

The standard 44 is preferably strengthened by a brace rod 50 secured at its forward end to the frame, as shown in Figure 7. Preferably, as indicated in Figure 4 of the drawings, there are a pair of standards 44, each standard being connected by a brace member 50 extending forwardly and fixed at its forward end to the main frame.

In Figure 6 of the drawings, the structure for pivotally supporting a bell crank upon the main frame is shown. As indicated in this view, the main frame consists of a pair of hollow metal beams 51 and 52. Interposed between these beams is a bridge or saddle 53 having upright extensions 54, the upper ends of which overlap and rest upon the beams 51 and 52, as clearly indicated. For the purpose of more securely fastening the saddle 53 to the beams of the main frame, each upright is formed with oppositely extending lugs 55. These lugs lie flat upon the beams 51 and 52 and are secured thereto by means of U-bolts 56 which straddle the beams and are normally secured thereto at their lower ends, as indicated at 57. The lower end of the saddle 53 is formed with coaxial journal portions 58 located below the brace of the main frame. Journaled in the bearing portions 58 is a pivot pin 59 upon which a bell crank lever is supported. The structure just described is substantially the same for supporting either of the bell cranks 27 or 28 but the specific structure shown in Figure 6 is that of the rear bell crank 28, this view being taken on the section line 6—6 of Figure 7. The only difference between the supporting structure for the rear bell crank 28 and that of the forward bell crank 27 is that the pivot pin 59 for supporting the rear bell crank is extended at one end, as indicated in Figure 6.

The extended end 60 of the pivot pin 59 has non-rotatively secured thereto an adjusting lever 61 movable to raise or lower the entire picker mechanism. It will be apparent from an inspection of Figure 6 that the bell crank 28 is non-rotatively secured to the pivot pin 59 by means of a key 62, and that, therefore, as the pivot pin is turned by means of the lever 61, the bell crank will be moved so as to raise and lower its forwardly extending arm 29, carrying the picker mechanism vertically with it. The preferred arrangement of elements whereby the adjusting lever 61 is applied to the illustrative structure includes a detent bracket 63 fixedly secured to the main frame 1 by means of a plate 64 and securing devices 65. The outer portion of the bracket 63 is curved along an arc struck about the center of the pivot pin 59 and is provided with a plurality of notches 66. For properly centering the detent bracket and for facilitating the assembly of the structure the lower lug 67 of the bracket is formed with a round opening so that the end of the pivot pin extension 60 may be rotatively received therein, as indicated in Figure 6. The end of the pivot pin extension 60 is shouldered, as indicated at 68, and is provided with a plurality of splines for the purpose of non-rotatively securing the adjusting lever 61 to the pivot pin. The preferred structure provided for this purpose includes a pivot block 70 formed with splines, or keyways, which interlock with the splines 69 of the pivot pin. The pivot block is also provided with a pin 71 extending in a direction parallel to the pivot pin and passing through a slot 72 in the adjusting lever 61, as clearly indicated in Figures 5 and 10 of the drawings. This arrangement of elements permits the picker mechanism to have a limited floating movement while the machine is in operation. The pivot block and the bell crank levers may have free oscillating movement regardless of the position in which the lever 61 is locked to the detent bracket 63.

In Figure 8 of the drawings, a rear elevation of the illustrative cotton picker is shown. As here indicated, the rear supporting wheels 72 and 73 are connected by the axle 74 arched upwardly, as indicated at 75', to provide a continuation of the plant passage-way above referred to. The upright portions of the axle 74 are rigidly secured to the lower ends of the beams 51 and 52 of the main frame.

Although the specific operative details of the internal structure of the picker mechanism form no part of the present invention, some of that structure is shown in the present case for the purpose of providing a clearer understanding of the present invention. After the cotton is removed from the cotton plants by the picker stems above described, and indicated in Figure 9 of the drawings, the cotton is conveyed by an elevator 75 to a cleaning mechanism including an endless conveyor 76, a carding roll 77, and a combined blower and ejector 78. The blower 78 throws the cotton downwardly to a position rearwardly of the machine where it is caught in receptacles 79 supported upon the rearward extension 45 of the main frame. As indicated in Figures 2 and 8 of the drawings, the extension 45 comprises a pair of hollow beams 81 and 82 which support the receptacle 79 and also a platform 83 provided for the attendant.

We claim:

1. A cotton picker comprising, in combination, a main frame extending in a fore and aft direction, picker mechanism located beneath the main frame, suspension connections between the main frame and the picker mechanism, means supporting said connections on the frame for free movement vertically, and means for supporting the picker mechanism on the connections so that it can swing pendulously laterally of the main frame.

2. A cotton picker comprising, in combination, rear supporting wheels, a main frame connecting said wheels to a front support and arched in a fore and aft direction, picker mechanism suspended beneath the mid-portion of the main frame, and a plurality of yieldably supported vertically movable pivotal connections between the main frame and the picker mechanism including longitudinal pivot pins supporting the latter and allowing the picker mechanism to swing pendulously laterally of the main frame.

3. A cotton picker comprising, in combination, a wheel supported main frame, said main frame being arched in a fore and aft direction and composed of arched members narrowly spaced relative to the spacing of the supporting wheels, picker mechanism suspended beneath the arched portion of the main frame, and longitudinally spaced pivotal connections each including a pivot pin arranged longitudinally centrally of the main frame and supporting the picker mechanism so that it is free to swing pendulously laterally of the main frame.

4. A cotton picker comprising, in combination, a narrow arched main frame, picker mechanism suspended beneath the main frame, longitudinally spaced pivotal suspension members between the picker mechanism and the main frame and affording a fore and aft extending axis of movement for permitting the picker mechanism to swing freely laterally of the main frame, and springs acting upon said pivotal connections so that substantially all of the weight of the picker mechanism will be resiliently supported while the picker is in operation.

5. A cotton picker comprising, in combination, a main frame, picker mechanism pendently attached to the main frame, pivotal connections between the main frame and picker mechanism including freely swinging parts for allowing the picker mechanism to swing freely laterally of the main frame, and means for yieldingly supporting said pivotal suspension members centrally of the main frame so that the picker mechanism may move vertically and swing to either side.

6. In a cotton picking machine, a main frame, picker mechanism pendently supported by the main frame, bell crank levers pivoted on the main frame, connections between the bell crank levers and the picker mechanism including freely swinging parts for permitting the entire picker mechanism to swing bodily upon a substantially horizontal axis extending in the direction of travel of the machine, means connecting the bell cranks so that they move in unison, means for adjusting the bell cranks to raise and lower the picker mechanism, and a device for yieldingly supporting the picker mechanism.

7. A cotton picker of the class described comprising, in combination, a narrow arched main frame, picker mechanism located beneath the main frame, said picker mechanism including opposed batteries of rotating picker stems, said batteries of picker stems being laterally spaced so as to be located on opposite sides of a passage-way through which cotton plants may pass, cotton handling mechanism extending rearwardly of each battery of picker stems, a housing for each cotton handling mechanism, each housing being secured to the picker mechanism to constitute a unitary body swingable as a unit about the main frame, and means pivotally connecting the picker mechanism and the cotton handling mechanism body to the main frame about a horizontal and longitudinal axis.

8. A cotton picker comprising, in combination, a main frame, picker means suspended beneath the main frame, bell crank levers pivoted at their elbows upon supports secured to the main frame, means for pivotally securing the picker means to the ends of the forwardly extending arms of the bell crank levers, an adjustable connection between the other arms of the bell crank levers, and elevating means connected to one of the bell crank levers and operable to turn that lever so as to raise the picker means.

9. A cotton picker comprising, in combination, an unstable main frame arched in a fore and aft direction, wheels supporting the rear of said main frame, draft connections at the forward end of the main frame adapted for pivotally supporting the forward end of the main frame upon a tractor, and cotton picking means pivotally suspended from the mid-portion of the main frame.

10. A cotton picker comprising, in combination, an unstable wheel supported main frame arched in a fore and aft direction, draft connections secured at the forward end of the main frame for pivotally supporting the frame upon a tractor, a body located beneath the main frame, said body including cotton picking means and cotton handling means extending rearwardly from the picking means, said cotton handling means including two spaced housings extending rearwardly from the picking means and straddling the main frame, and pivotal connection between said body and the main frame for permitting the body to swing transversely of the path of movement of the main frame.

11. A cotton picker comprising, in combination, a narrow arched main frame, picker mechanism suspended beneath the main frame, pivotal connections between the picker mechanism and the main frame including freely swinging parts for permitting the picker mechanism to swing freely laterally of the main frame, and spring supporting means attached to said pivotal connections so that substantially all of the weight of the picker mechanism will be resiliently supported while the picker is in operation.

12. A cotton picker comprising, in combination, a main frame, picker mechanism floatingly suspended beneath the main frame, pivotal connections between the picker mechanism and the main frame including freely swinging parts for permitting the picker mechanism to swing freely laterally of the main frame, and spring supporting means connecting the frame and the picker mechanism so that substantially all of the weight of the picker mechanism will be resiliently supported while the picker is in operation.

13. A cotton picker comprising, in combination, a main frame, cotton picking means supported by the main frame, pivotal connections between the main frame and the cotton picking means including freely swinging parts permitting the picking means to swing freely to and fro laterally of the main frame as the cotton picker is operating, and supporting devices cooperating with the pivotal connections to enable picking means to have a substantially free floating movement.

14. A cotton picker comprising, in combination, a main frame, freely swingable picker mechanism suspended beneath the main frame, connections between the picking mechanism and the main frame including freely swingable parts for permitting substantially free lateral movement of the picker mechanism relative to the main frame, and means cooperating with said connections to constantly yieldably sustain nearly the entire weight of the picker mechanism to allow the picker mechanism to have substantially free floating movement.

15. A cotton picker comprising, in combination, a main frame, freely swinging picker mechanism, connections including freely swinging parts between the main frame and the picker mechanism for permitting the picker mechanism to move laterally of the main frame, counter-balancing means secured to and cooperating with the connections so as to permit the picker mechanism to have a floating movement as the machine proceeds along the ground, means for adjusting the vertical position of the picker mechanism relative to the main frame, and means cooperating with the adjusting means to limit the floating movement of the picker mechanism.

16. A cotton picker comprising, in combination, a main frame, laterally freely swinging picker mechanism supported by the main frame, connections between the picker mechanism and the main frame affording a single horizontal axis about which the picker mechanism swings freely laterally of the main frame, counter-balancing means secured to the connections so as to allow the picker mechanism to have substantially free vertical floating movement, means for changing the vertical position of the picker mechanism relative to the frame, and stops cooperating with said last named means to limit the vertical floating movement of the picker mechanism.

17. A cotton picker comprising, in combination, a main frame, picker mechanism, a bell crank lever for supporting the forward end of the picker mechanism, a second bell crank mounted rearwardly of the first mentioned bell crank for supporting the rearward portion of the picker mechanism upon the main frame, means connected to the main frame for pivotally and adjustably supporting the elbow of the bell crank levers upon the main frame, means for pivotally connecting the forwardly extending arms of each bell crank with the picker mechanism so as to permit the picker mechanism to swing laterally of the main frame about a single horizontal axis, a turnbuckle pivotally connecting the upwardly extending arms of the bell crank levers, a counter-balancing device pivotally connecting the upwardly extending arm of one of the bell crank levers to a fixed part, means for elevating the picker mechanism, and a lost motion connection between said elevating means and the bell cranks for permitting the picker mechanism to have a limited vertical floating movement.

In testimony whereof we affix our signatures.

EDWARD A. JOHNSTON.
BERT R. BENJAMIN.
DAVID B. BAKER.

CERTIFICATE OF CORRECTION.

Patent No. 1,727,708.

Granted September 10, 1929, to

EDWARD A. JOHNSTON ET AL.

It is hereby certified that error appears in the printed specification of the above numbered patent requiring correction as follows: Page 4, lines 97 and 98, claim 4, strike out the words "longitudinally spaced pivotal suspension members" and insert instead "pivotal connections"; same page, lines 109 and 110, claim 5, for the words "pivotal connections" read "longitudinally spaced pivotal suspension members"; and that the said Letters Patent should be read with these corrections therein that the same may conform to the record of the case in the Patent Office.

Signed and sealed this 18th day of February, A. D. 1930.

(Seal)

M. J. Moore,
Acting Commissioner of Patents.

ing movement, means for changing the vertical position of the picker mechanism relative to the frame, and stops cooperating with said last named means to limit the vertical floating movement of the picker mechanism.

17. A cotton picker comprising, in combination, a main frame, picker mechanism, a bell crank lever for supporting the forward end of the picker mechanism, a second bell crank mounted rearwardly of the first mentioned bell crank for supporting the rearward portion of the picker mechanism upon the main frame, means connected to the main frame for pivotally and adjustably supporting the elbow of the bell crank levers upon the main frame, means for pivotally connecting the forwardly extending arms of each bell crank with the picker mechanism so as to permit the picker mechanism to swing laterally of the main frame about a single horizontal axis, a turnbuckle pivotally connecting the upwardly extending arms of the bell crank levers, a counter-balancing device pivotally connecting the upwardly extending arm of one of the bell crank levers to a fixed part, means for elevating the picker mechanism, and a lost motion connection between said elevating means and the bell cranks for permitting the picker mechanism to have a limited vertical floating movement.

In testimony whereof we affix our signatures.

EDWARD A. JOHNSTON.
BERT R. BENJAMIN.
DAVID B. BAKER.

CERTIFICATE OF CORRECTION.

Patent No. 1,727,708.

Granted September 10, 1929, to

EDWARD A. JOHNSTON ET AL.

It is hereby certified that error appears in the printed specification of the above numbered patent requiring correction as follows: Page 4, lines 97 and 98, claim 4, strike out the words "longitudinally spaced pivotal suspension members" and insert instead "pivotal connections"; same page, lines 109 and 110, claim 5, for the words "pivotal connections" read "longitudinally spaced pivotal suspension members"; and that the said Letters Patent should be read with these corrections therein that the same may conform to the record of the case in the Patent Office.

Signed and sealed this 18th day of February, A. D. 1930.

(Seal)

M. J. Moore,
Acting Commissioner of Patents.